United States Patent [19]

Wilhelmsson

[11] 4,115,017
[45] Sep. 19, 1978

[54] DEVICE FOR DRILLING HOLE OF PREDETERMINED DEPTH

[76] Inventor: Wilhelm H. Wilhelmsson, Fack 94, 572 00 Oskershamn, Sweden

[21] Appl. No.: 686,443

[22] Filed: May 13, 1976

[30] Foreign Application Priority Data

Mar. 17, 1976 [SE] Sweden ............................. 7603336

[51] Int. Cl.² .......................................... B23B 47/18
[52] U.S. Cl. ...................................... 408/14; 408/141; 408/202; 408/241 S
[58] Field of Search ................... 408/14, 84, 141, 202, 408/241 S

[56] References Cited

U.S. PATENT DOCUMENTS

| | | | |
|---|---|---|---|
| 2,796,161 | 5/1957 | Graybill | 408/14 X |
| 3,620,636 | 11/1971 | Godard | 408/84 |
| 3,762,827 | 10/1973 | Ziegelmeyer | 408/14 |
| 3,767,313 | 10/1973 | Bohoroquet et al. | 408/14 |
| 3,794,435 | 2/1974 | Haley | 408/141 X |

*Primary Examiner*—John Sipos
*Attorney, Agent, or Firm*—William Anthony Drucker

[57] ABSTRACT

Device for drilling a hole of predetermined depth having an abutment member non-rotatable in relation to the stationary part of the drilling machine and provided with an abutment surface intended to come into contact with the work piece by the displacement of the drill spindle of said drilling machine towards the work piece, a driving member intended to be connected to the drill spindle said driving member being rotatably and displaceably arranged in relation to the abutment member, a holding member intended to hold the drill and being rotatably mounted relative to the abutment member and displaceably but not rotatably connected to the driving member and provided to be secured against axial displacement in relation to the abutment member and a spring provided between said driving member and said abutment member, the driving member being displaceably in a direction towards the work piece against the action of said spring.

1 Claim, 1 Drawing Figure

U.S. Patent   Sept. 19, 1978   4,115,017
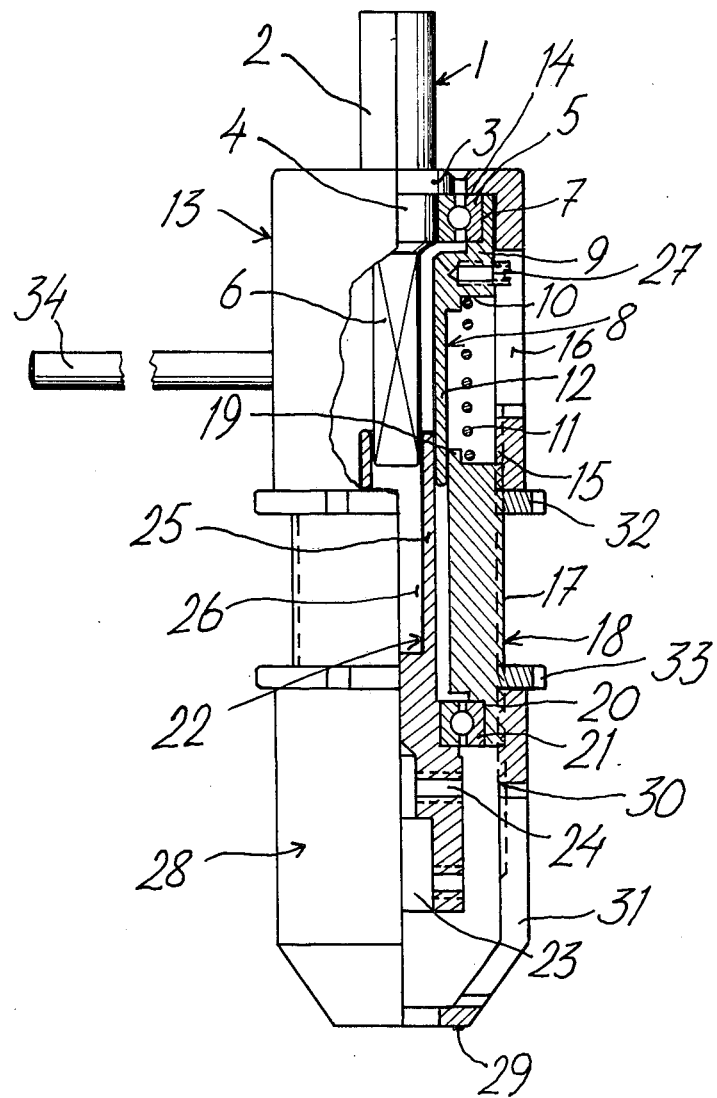

DEVICE FOR DRILLING HOLE OF PREDETERMINED DEPTH

This invention refers to a device for drilling hole of a predetermined, preferably adjustable, depth.

Devices of this kind are well known in the art. However, hitherto a device is not known which is suitable for instance for multiple spindles drilling a machines with high demands upon accuracy concerning drill depths and suitable for materials which can be badly influenced by the engagement of a rotating stop member. This is especially the case when working in wood and in cases where the material is of varying thickness or has laminations of varying qualities or when the work piece is of such a shape that the places for the drillings are positioned at different levels in relation to the horizontal plane. With devices of the known art it is not possible to carry out such drillings in a non-objectionable manner.

Thus, the main object of the invention is to obtain a device permitting accurate drilling and which, furthermore, by the obtained drill depth does not exert such an influence upon the work piece that bothering marks or the like are impressed on the same.

To accomplish these and other objects the invention has the characteristics of the claims.

The accompanying drawing shows an exemplifying embodiment of the invention and the FIGURE illustrates a longitudinal section through the device.

The device shown in the drawing has a driving member 1 intended to be connected to the spindle of the drilling machine. Consequently, the driving member may, as in the illustrated example, be cylindrical as at 2 in the upper part thereof, but may also be shaped as a Morse cone or the like. The driving member has a flange 3 and a cylindrical guiding part 4 for the inner ring of a ball bearing 5. The lower part of the driving member 1 has a section differing from the cylindrical shape, and may for example comprise a cylindrical member which has flat milled portions to define a substantially rectangular section. This part 6 of the driving member is to define a follower to be further described. The outer ring of the ball bearing 5 is fitted into a bore 7 in a guiding member generally designated 8. The guiding member 8 has an outwardly projecting annular flange 9 in the upper portion thereof, and said flange is provided with an abutment 10 and the upper portion of a spiral spring 11 is to be guided thereby. A downwardly directed tubular member 12 extends from the flange 9. The flange 9 is guided in a housing member 13 provided with an upper inwardly directed flange 14, which defines the axial limit for the outer ring of the ball bearing 5.

The housing member is internally threaded at 15 and an elongated hole 16 is provided in the same. The threading 15 of the housing member engages an outer threading 17 of a sleeve 18, which has an annular abutment 19 in the upper portion thereof to guide the lower portion of spring 11. The upper portion of the sleeve 18 defines a guiding means for the lower portion 12 of the guiding member 8. The lower portion of the sleeve has a bore 20 and the outer ring of the ball bearing 21 fits thereinto and the inner ring thereof is connected to a holding member 22 to secure the drill such as a teat drill. For this purpose, the holder has a central bore 23 and threaded holes 24 for screws to secure the drill in the hole 24. The holding member 22 has an upwardly directed portion 25, which is exteriorly cylindrical so that it displaceably engages the downwardly directed portion 12 of the guiding member 8. The portion 25 has a central hole in the upper portion thereof, which has a such a shape, differing form the cylindrical shape, that portion 6 of the driving member 1 is displaceably but not rotatably mounted in relation to the holding member 22. Thus, by means of a screw 27 threaded in the flange 9 of the guiding member 8 and guided by the elongated hole 26 it is obtained that said guiding member 8 is displaceable but not rotatable in relation to the housing member 13. An abutment member 28 shaped as a sleeve provided with a lower abutment edge 29 to engage the work piece has an internal thread 30 to engage the thread 18 of the sleeve 18 and is furthermore provided with openings 31 permitting access to the attachment screws for the drilling tool. In order to secure the housing member 13 and the abutment member 28, respectively, in the desired axial positions in relation to the sleeve 18, locking nuts 32, 33 are provided and in order to make sure that the housing member is not permitted to rotate an arm 34 is connected to said housing member and arranged to abut against for example the drilling stand. The illustrated device operates in the following manner: The driving member 1, which is connected to the drilling machine, is brought to rotate by the same and also the holding member 22 is brought into said rotational movement and thereby also the drilling tool. In the feeding movement of the drilling spindle the complete device also takes part until the abutment edge 29 engages the work piece. In the further feeding movement, only the driving member 1 and the guiding member 8 takes part and this movement occurs against the action of spring 11. Thus, the pressure of the abutment member 28 towards the work piece is dependant upon the force of the spring and may be adjusted or set by means of the dimensioning of the spring or by means of setting of the effective length thereof. The last mentioned setting is accomplished by threading the sleeve 18 into and out, respectively, in relation to the housing member 13. It is understood that the spring pressure is weak when the sleeve 18 is only threaded a short distance into the housing member 13, but greater when the sleeve 18 is threaded a longer distance thereinto. To set the drill depth when the drill has been fixed by the holding member 22 the abutment member 28 is inwardly or outwardly threaded in relation to the sleeve 18 and is locked in the position in which the distance between the end of the drill and the abutment edge 29 corresponds to the desired drill depth.

I claim:

1. A device, for incorporation between an axially movable drill spindle and a drill bit, comprising:
   (i) a driving member for connection to the drill spindle so as to move axially and rotationally with said drill spindle
   (ii) a guiding member disposed about said driving member and mounted thereon by bearing means which permit relative rotation but prevent relative axial movement
   (iii) a drill holding member, to receive the drill bit, engaged with said driving member so as to be relatively axially slidable but keyed against relative rotation, said drill holding member including a portion which is slidable axially between the drill holding member and the guiding member,
   (iv) an assembly of a housing and a sleeve, the sleeve being externally threaded and the housing being internally threaded and engaged by its threading on an end of the sleeve so as to be adjustable axially, said assembly being positioned about the driving member, the guiding member and the drill holding member, the sleeve being coupled to the drill holding member by an axial thrust bearing, the guiding member being axially slidable in the housing but keyed against relative rotation, (v) compression spring means positioned between the guiding member and the sleeve for transmitting from the driving member to the drill holding member an axial thrust which is adjustable by axial adjustment of the housing on the sleeve, (vi) an abutment member which is internally threaded and is engaged on the other end of the sleeve, said abutment member being positioned about and extending axially beyond the drill holding member to abut a workpiece, axial adjustment of the abutment member with respect to the sleeve serving to adjust the extent to which the drill holding member may approach the workpiece and thereby adjusting the depth to which the drill bit may enter the workpiece, (vii) stop means coupled to the housing, the sleeve, and the abutment means for preventing rotation thereof when the driving member rotates.

* * * * *